PROCESS FOR RECOVERING FEED PRODUCTS FROM ANIMAL WASTE

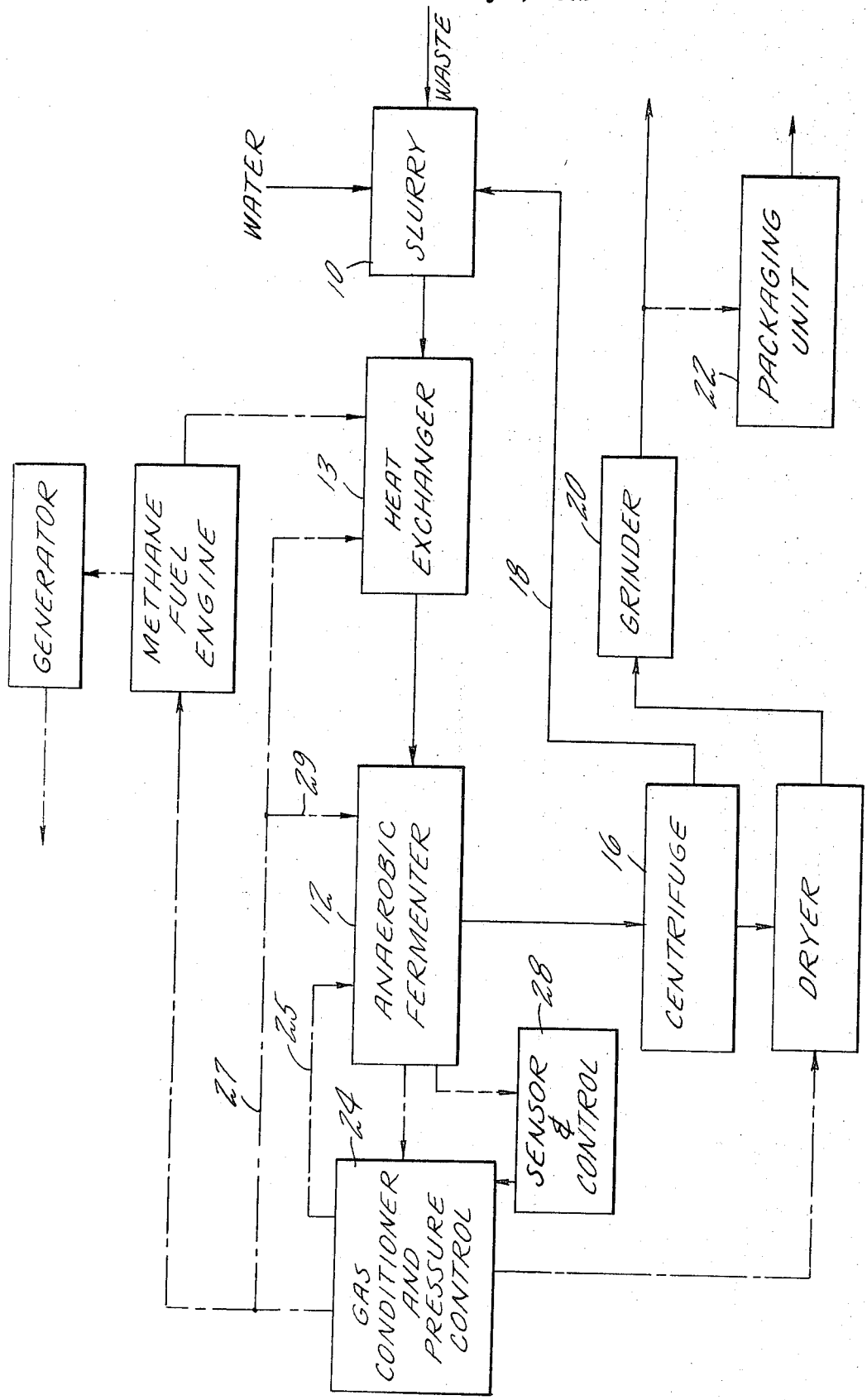

Warren B. Coe, Simsbury, and Arthur K. Davenport, North Granby, Conn., assignors to United Aircraft Corporation, East Hartford, Conn.
Filed May 8, 1972, Ser. No. 251,491
Int. Cl. A23k 1/00
U.S. Cl. 426—55      4 Claims

ABSTRACT OF THE DISCLOSURE

By thermophilic anaerobic fermentation, the excretion and excrement from animals is recycled into an animal feed ingredient and a fuel gas which gas is utilized to power the various components of the system and is characterized as being self-sustaining.

BACKGROUND OF THE INVENTION

This invention relates to a waste conversion system and process thereof and more particularly to means and process for obtaining protein rich animal feed ingredient from animal waste by the use of thermophilic anaerobic fermentation. Additionally, methane rich fuel gas generated thereby is utilized as the energy source to make the system self-sustaining.

As is generally well known in the art several attempts have been made to convert animal waste into animal feed as is exemplified, for example, in Pat. No. 3,462,275 granted to W. D. Bellamy on Aug. 19, 1969, and Pat. No. 3,546,812 granted to Masayasu Kobayashi et al. on Dec. 15, 1970. In both of these systems aerobic chambers are utilized which require the introduction of oxygen and/or air and both systems require the introduction of cultures.

It is also well known in the art that anaerobic processes have been used as the method of stabilization of municipal sewage sludge and as such the fermentation is for the destruction of the waste matter rather than the growth of the nutrients in the waste.

We have found that by the utilization of anaerobic fermentation and controlling the pressure, temperature, waste concentration and residence time we are able to produce in a laboratory, feed ingredient which is characterized as having a high crude protein and amino acid content with a high degree of digestibility of the nutrients and the feed ingredient was proven to be free from undesirable or harmful materials such as estrogenics, antibiotics, pathogenic organisms. Additionally, a methane rich fuel gas has been obtained in such quantities as to show that it is sufficient to power the necessary component parts of this system without the need of additional source of energy.

SUMMARY OF THE INVENTION

An object of this invention is to convert animal waste into an animal feed ingredient by the use of a thermophilic anaerobic fermentator without the requirement of any additives like nutrients and/or organisms.

A still further object of this invention is to provide a process for obtaining an animal feed ingredient from animal waste by anaerobically fermentating the waste under controlled temperature and pressure conditions for a predetermined period of time.

A still further object is to provide a system converting animal waste into an animal feed ingredient by use of an anaerobic fermentator while at the same time generating sufficient fuel to power the various components of the system.

A still further object of this invention is to provide a system and process for obtaining an animal feed ingredient from excrement and excretions which system and process is characterized as having the following features.

(1) Production of products utilized by animal feeders from animal waste.
(2) Non-polluting process for animal manure disposal.
(3) Production of gas and electric power from waste.
(4) Production of an animal feed ingredient rich in crude protein and amino acids and containing other nutrients such as calcium and phosphorus.
(5) Production of an animal feed ingredient by a process which destroys residual antibiotics such as chlortetracycline which may be present in manure.
(6) Production of an animal feed ingredient by a process which destroys residual growth stimulants such as diethylstilbestrol which may be present in manure.
(7) Produces an animal feed ingredient by a process which destroys residual pathogenic bacteria such as salmonella which may be present in manure.
(8) Fermentation process pH control by means of carbon dioxide partial pressure over and dissolved in fermentation broth.
(9) Converts nonprotein nitrogen to amino acids.
(10) Concentrates protein and other nutrients.
(11) All solids are usable as feed ingredient.
(12) All gases discharged are $CO_2$ and water vapor with a minute trace of sulfur in the order of less than 0.1%.
(13) All vapor and liquid discharged are recycled back into the system.

Other features and advantages will be apparent from the specification and claims and from the accompanying drawings which illustrate an embodiment of the invention.

BRIEF DESCRIPTION OF THE DRAWING

The sole figure is a block diagrammatic illustration of the invention.

DESCRIPTION OF THE PREFERRED EMBODIMENT

As viewed from the sole figure, animal excretion and excrement is introduced into the slurry tank 10 where it is mixed with water either recycled or from a water source or the combination thereof into a slurry with a minimum of 10% of solids by weight. The slurry is metered to fermentation chamber 12 after passing through a heat exchanger 13. Fermentation chamber 12 is preferably operated at a thermophilic temperature of 40° C. to 60° C. The fermentation chamber is an enclosed vat that has been purged so as to remove all of the oxygen. Since the fermentation operates in the absence of oxygen it is anaerobic.

The chemical and biological breakdown of the constituents of the waste (fat, fibre, carbohydrates, and protein, etc.) are reduced by the fermentation to yield methane, $CO_2$ and a feed ingredient. It has been found that the system is most efficacious when the pH in the fermenter is held between 6–7.

The gases produced in the fermenter are bled off and pass to the combined pressure controller and gas conditioner 24. This serves to concentrate the $CO_2$ and control the pressure in the fermenter. The partial pressure of $CO_2$ is controlled so as to maintain the pH in the fermentation broth by returning a portion of $CO_2$ to the fermenter via line 25. It has been found that for the best results the total pressure in the fermenter should be approximately one atmosphere. pH sensor and controller 28 monitor the pH in the fermenter and compare it to a predetermined value such that any deviations adjust pressure controller and gas conditions 24 to restore the pH to the desired level.

A portion of the gas is directed from the pressure controller and gas conditioner 24 back to the fermenter tank via lines 27 and 29 to agitate the broth.

The effluent from the fermenter is continuously dewatered by centrifuge 16 and the concentrate is returned to slurry tank 10 via the line 18 where it is mixed with the incoming waste. The moist cake from centrifuge 16 is dried in any suitable means as for example gas fired drier into a cattle feed ingredient.

Laboratory samples of processed cattle manure have been shown to contain a high degree of crude protein, rich in amino acid and other nutrients such as calcium and phosphorus.

The cake may be ground by a suitable grinder 20 and fed as a feed ingredient directly to the animals or packaged by a suitable packaging unit 22 or may be taken directly off the centrifuge.

Heat and power is provided by the processed methane gas. A portion of it being utilized to operate a suitable electrical generator, a portion is utilized to fire the gas drier and a portion is converted to heat energy so as to maintain the desired temperature in the fermenter by heat exchanger 13. The engine driving the electrical generator may discharge its waste heat into heat exchanger 13 to take full advantage of energy conservation.

The following tests are illustrative of the invention and are not to be construed as limitations thereof.

TEST I

Fecal waste material from steers being fed a high concentrate ration were mixed with tap water to form a slurry containing 10% solids. This slurry was continuously fed into an anaerobic fermentator at a rate to achieve a 12½ day residence time and which was maintained at a temperature of 120° F. The gas produced contained 52% methane, 46% carbon dioxide and 2% water vapor and others. The gas was maintained at a total back pressure of 1″–3″ $H_2O$ and the fermentator pH was observed to be 6.3–6.7. The gas production rate which resulted was calculated to be 8.2 feet$^3$ of gas for each pound of volatile solids in the feed material. The fermentator liquid effluent was collected, dried at 120° F., ground to make uniform, and analyzed by conventional techniques. The tabulation in Table 1 presented hereinbelow shows a comparison of the waste and the product and the percentages pertaining to dry matter.

TABLE 1.—COMPARISON OF WASTE RAW MATERIAL AND FERMENTATION PRODUCT

| | Waste | Product |
|---|---|---|
| Crude protein (percent) | 12.9 | 25.2 |
| Fat (percent) | 1.0 | 1.3 |
| Fibre (percent) | 33.1 | 22.8 |
| NFE (percent) | 47.8 | 40.4 |
| Ash (percent) | 5.2 | 10.3 |
| Total amino acids (percent) | 5.0 | 18.82 |
| Alanine (percent) | .47 | 1.49 |
| Valine (percent) | .27 | 1.17 |
| Glycine (percent) | .32 | 1.05 |
| Isoleucine (percent) | .20 | 1.17 |
| Leucine (percent) | .48 | 1.79 |
| Proline (percent) | .32 | 1.03 |
| Threonine (percent) | .26 | 1.00 |
| Serine (percent) | .25 | 0.90 |
| Methionine (percent) | .12 | 0.42 |
| Hydroxyproline (percent) | .03 | 0.05 |
| Phenylalanine (percent) | .27 | 1.25 |
| Aspartic acid (percent) | .53 | 1.92 |
| Glutamic acid (percent) | .82 | 2.48 |
| Tyrosine (percent) | .18 | 0.68 |
| Lysine (percent) | .18 | 0.99 |
| Histadine (percent) | .10 | 0.50 |
| Arginine (percent) | .15 | 0.70 |
| Tryptophan (percent) | | 0.05 |
| Cystine/2 (percent) | .05 | 0.07 |
| Diaminopimelic acid (percent) | | 0.11 |
| Amino acid/crude protein | .40 | .75 |

TEST II

Samples of chlortetracycline at the level of 22 gms. per ml. water, and diethylstilbestrol at 40 gms. per ml. water were placed in flasks, purged with nitrogen to displace all dissolved and free oxygen, then incubated in an oven maintained at 120° F. for five days. Control samples were frozen at the start of the test as were the exposed samples at the test conclusion. Samples were then analyzed for residuals of these materials. The tabulation in Table 2 shows the results of this evaluation:

TABLE 2

| Sample | Residual, Mg/ml. | Percent destruction |
|---|---|---|
| Chlortetracycline control | 24.6 | |
| Chlortetracycline 120° F., 5 days | .975 | 96 |
| Diethylstilbestrol control | 25.1 | |
| Diethylstilbestrol 120° F., 5 days | 6.9 | 72.5 |

Samples of the product have been analyzed by a feed evaluation laboratory for the presence of salmonella with none detected.

TEST III

Samples of the dried product were mixed with a basal diet such that the product made up 7–7½% of the experimental diet. The experimental diet was fed to 36 Pilch White Rock male chicks of 14 days age while an additional 18 chicks were fed only the basal diet. The feeding trial lasted 14 days during which time there was no bird mortality indicating that there were no severe toxic elements present in the product. Birds on the experimental ration and the basal diet were compared on the basis of feed efficiency and there were no significant differences between the two groups indicating that there were no digestive inhibiting substances present and that the product was equivalent to the basal diet.

The term animal feed ingredient is not to be limitedly construed, as it is contemplated that in a beef animal waste recycle system, the feed would form a constituent of the animal's basic diet but it could also be the basic diet for other animals.

It should be understood that the invention is not limited to the particular embodiments shown and described herein, but that various changes and modifications may be made without departing from the spirit or scope of this novel concept as defined by the following claims.

1. A process for converting animal excrement having a normally low amount of amino acid content and significant amount of non-protein nitrogen into animal feed and a source of energy including the steps of:
   (1) mixing the excrement with a predetermined amount of water so that the solid content is 10% or higher by weight,
   (2) anaerobically fermenting the slurry, formed in the step of mixing, in the absence of a pure or enriched culture for a predetermined time, at a pressure of substantially 1 atmosphere, a temperature of between 40°–60° C. and a pH of 6–7 in order to convert the non-protein nitrogen portion of the excrement into amino acids to increase the total amino acid content and to convert the organic matter into micro organisms in order to maximize the biological population and to produce a gas containing in the majority methane and carbon dioxide,
   (3) drying the broth obtained from the step of fermenting and
   (4) converting the methane fuel obtained in the step of fermenting to supply the energy required in the steps of mixing, fermenting and drying.

2. A process as claimed in claim 1 wherein the step of drying includes centrifuging the fermented broth obtained in the step of fermenting.

3. A process as claimed in claim 1 including the step of separating out the $CO_2$ content obtained in the step of fermenting and returning the separated $CO_2$ to the fermentation to control the partial pressure of $CO_2$ to maintain pH level.

4. A process for converting the excrement of beef cattle having a normally low amount of amino acid content and significant amount of non-protein nitrogen into feed ingredient and a source of energy including the steps of:

(1) mixing the beef cattle excrement with a predetermined amount of liquid so that the solid content is 10% or higher by weight, (2) anaerobically fermenting the slurry, formed in the step of mixing, in the absence of a pure or enriched culture, for a predetermined time, at a pressure of substantially 1 atmosphere, a temperature of between 40°–60° C. and a pH of 6–7 in order to convert the nonprotein nitrogen portion of the excrement into amino acids to increase the total amino acid content and to convert the organic matter into micro organisms in order to maximize the biological population and produce a gas containing in the majority methane and carbon dioxide, (3) drying the broth obtained from the step of fermenting so that the dried solids are reusable as a feed ingredient, (4) converting the methane fuel obtained in the step of fermenting to supply the energy required in the steps of mixing, fermenting and drying, (5) separating $CO_2$ from the gasses produced in the step of fermenting and controlling its partial pressure above the surface of the fermenting broth so as to control the pH level of the broth.

References Cited

UNITED STATES PATENTS

| | | | |
|---|---|---|---|
| 3,546,812 | 12/1970 | Kobayashi et al. | 210—16 X |
| 3,462,275 | 8/1969 | Bellamy | 426—53 |
| 2,029,702 | 2/1936 | Buswell et al. | 210—2 |

LIONEL M. SHAPIRO, Primary Examiner

U.S. Cl. X.R.

210—2